United States Patent [19]

Woodward et al.

[11] Patent Number: 5,755,845
[45] Date of Patent: May 26, 1998

[54] METHOD AND APPARATUS FOR BENDING AND TEMPERING GLASS SHEETS

[75] Inventors: Alan Charles Woodward, Winstanley, United Kingdom; Han-Dieter Funk, Witten, Germany; Richard A. Herrington, Walbridge, Ohio

[73] Assignees: Pilkington Glass Limited, Merseyside, United Kingdom; Flachglas Aktiengesellschaft, Furth, Germany; Libbey-Owens-Ford Company, Toledo, Ohio

[21] Appl. No.: 777,003

[22] Filed: Jan. 3, 1997

Related U.S. Application Data

[63] Continuation of Ser. No. 420,667, Apr. 12, 1995, abandoned.

[30] Foreign Application Priority Data

Apr. 15, 1994 [GB] United Kingdom .................... 9407609

[51] Int. Cl.⁶ ............................ C03B 23/023; C03B 27/00
[52] U.S. Cl. ............................. 65/102; 65/104; 65/106; 65/114; 65/275; 65/287; 65/356
[58] Field of Search ............................. 65/106, 273, 274, 65/287, 275, 268, 269, 244, 102, 104, 114, 64, 355, 356; 249/78

[56] References Cited

U.S. PATENT DOCUMENTS

| | | | |
|---|---|---|---|
| 3,338,695 | 8/1967 | Ritter, Jr. | 65/356 |
| 3,421,875 | 1/1969 | Kirkman | 65/356 |
| 3,459,521 | 8/1969 | Nedelec | 65/356 |
| 3,507,639 | 4/1970 | Seymour | 65/356 |
| 3,582,304 | 6/1971 | Bognar | 65/106 |
| 3,753,673 | 8/1973 | Pickard, et al. | |
| 3,854,920 | 12/1974 | Kay et al. | 65/106 |
| 4,071,345 | 1/1978 | Werner et al. | 65/287 |
| 4,199,342 | 4/1980 | Mestre et al. | 65/106 |
| 4,285,715 | 8/1981 | Frank | 65/106 |
| 5,178,660 | 1/1993 | Wampler, et al. | |
| 5,279,635 | 1/1994 | Flaugher, et al. | |
| 5,437,703 | 8/1995 | Jacques et al. | 65/106 |
| 5,441,551 | 8/1995 | Ollfisch, et al. | |
| 5,672,189 | 9/1997 | Funk et al. | 65/106 |

FOREIGN PATENT DOCUMENTS

| | | |
|---|---|---|
| 0451469 | 10/1991 | European Pat. Off. |
| 0531153 | 3/1993 | European Pat. Off. |
| 1580305 | 9/1969 | France. |
| 4208219 | 3/1992 | Germany. |
| 2011377 | 7/1979 | United Kingdom. |
| WO90/15781 | 12/1990 | WIPO. |
| WO 93/14038 | 7/1993 | WIPO. |

*Primary Examiner*—Steven P. Griffin
*Attorney, Agent, or Firm*—Burns, Doane, Swecker & Mathis, L.L.P

[57] ABSTRACT

The invention relates to the press bending and tempering of glass sheets, especially for use as glazings in vehicles. When the press bending system is not located in a heated environment such as a furnace, it is important to maintain the glass sheets at a sufficiently high temperature for an adequate degree of temper to be achieved on quenching the sheet. The present invention provides a method of bending and tempering a thin glass sheet comprising pressing the substantially horizontal sheet between moulds having opposed complementary shaping surfaces, at least one of the surfaces being heated, and subsequently quenching the surfaces of the sheet characterised in that the heated shaping surface is maintained at a temperature in the range from 200° C. to 350° C.

20 Claims, 6 Drawing Sheets

1

METHOD AND APPARATUS FOR BENDING AND TEMPERING GLASS SHEETS

This application is a continuation of application Ser. No. 08/420,667, filed Apr. 12, 1995, now abandoned.

BACKGROUND OF THE INVENTION

1. Field of the Invention

The present invention relates to the bending and tempering of glass sheets, and more particularly, to an improved method and apparatus for press bending and tempering thin glass sheets for glazing vehicles. By "press bending", a shaping process is meant in which a heat-softened glass sheet is pressed between complementary opposed shaping surfaces which are provided on press members such as moulds.

2. Description of the Related Art

When producing tempered curved panes of glass for the windows of vehicles such as cars, a number of requirements need to be met simultaneously. First, a pane must satisfy relevant safety requirements, such as ECE R43 in Europe, which lays down approved fracture patterns intended to reduce injuries incurred in the event of breakage of the glass. The pane should also be of the correct size and shape for the opening in the vehicle which it is intended to fit. It should further be free from surface defects and of sufficient optical quality to permit a distortion-free view through the window. Additionally, the cost of the pane has to be acceptable to the customer, the vehicle manufacture.

For press bending, glass sheets are generally conveyed through a heating furnace while being heated to a heat-softened condition, before passing to a press bending station, where each sheet is shaped by pressing between complementary opposed shaping surfaces. These surfaces are normally the surfaces of moulds, and a different pair of moulds is needed for each differently shaped pane of glass to be produced. Unless the press bending station is itself located within the heated environment, the moulds are cold when newly installed at the start of a production run, and in the past little or no saleable glass was produced for a certain length of time after start-up owing to a variety of faults attributable to the cold moulds. During this period, the hot glass sheets heated the moulds up to their operating temperature, and this could take from 15 to 40 minutes depending on the cycle time, and the thickness and temperature of the glass. This loss of production is obviously undesirable, especially when production runs are short, as it adds to costs.

Furthermore, such press bending systems had to be operated at a relatively short maximum cycle time when producing tempered glass panes, otherwise a bent glass sheet would cool excessively between bending and quenching, resulting in an inadequate degree of temper, i.e. a fracture pattern which did not satisfy the relevant standard. While a short cycle time is desirable from the point of view of reducing operating costs, it may not afford sufficient time to bend the glass sheet to the desired shape without introducing optical distortion. This is particularly true for complex shapes, i.e. those having curvatures in two directions at right angles to each other. To produce tempered glass panes of modern complex shapes satisfactorily it is important to have available sufficient time for the bending part of the cycle, and yet still maintain a sufficiently high temperature in the glass sheet for it to be adequately tempered on quenching.

All these difficulties are compounded when bending and tempering thin glass, since thin glass sheets cool more quickly than thick ones. In the past, glass 5 or 6 mm thick was generally used for automotive applications. However, owing to pressure to reduce weight in vehicles, car manufacturers began to specify nominal thicknesses of 4 mm and then 3 mm for tempered automotive glass. Given manufacturing tolerances, the term 'thin glass' covers a range of thicknesses up to 4.2 mm (usually, but not necessarily, from 2.8 mm to 4.2 mm) in the context of tempered glass.

Press bending systems are known in which the press bending station is heated, e.g. it is also located in the furnace. While this avoids the loss associated with start-up described above, and removes the time constraint on bending, such systems are expensive in terms of both capital cost and running cost. To avoid such expense, it would be desirable to alleviate the above mentioned drawbacks of the cheaper bending systems in which the press bending station is not heated.

One possibility is to heat the moulds as opposed to the whole press bending station. U.S. Pat. No. 3,753,673 discloses a press bending system in which glass sheets are suspended vertically from tongs. At the 1968 priority (late, glass used in motor vehicles was 5 or 6 mm thick, and it was found that after bending the glass sheet, a further change in the shape of the bent sheet occurred. This phenomenon, known as "spring-back", resulted from differential cooling of the two major surfaces of the bent sheet, which occurs when the sheet is deformed between the moulds, particularly if they are of dissimilar construction. It was alleviated by heating one or both of the moulds to reduce the differential cooling.

In present-day press bending systems, the glass sheets are supported substantially horizontally throughout the process, including during bending, and the shape of a bent sheet is constrained by gravity onto its supporting surface after bending. Furthermore, since the glass sheets are now generally rather thinner, thermal conduction reduces any temperature differential between the two major surfaces of the sheet, and as the sheet is no longer suspended in an unconstrained condition, spring-back is less of a problem.

WO 93/14038 has as its object the provision of an improved method of establishing a predetermined temperature profile in a relatively thin glass sheet conducive to proper bending. It discloses an upper mould provided with heating elements which can be used to either control the rate of heat dissipation from a glass sheet, or to reheat it. In the former case, temperatures of 371° C. to 427° C. are produced at the shaping surface, whereas in the latter case, rather higher temperatures of 538° C. to 649° C. are needed.

SUMMARY OF THE INVENTION

Hitherto, such relatively high shaping surface temperatures have been considered necessary in heated moulds to obtain an adequate temper in thin glass sheets transferred from a press bending station to a tempering station at moderate cycle times. It has been found that, surprisingly, even thin glass sheets can be adequately tempered after transfer from a press bending station in which the sheets are shaped between opposed complementary shaping surfaces maintained at significantly lower temperatures.

The present invention provides a method of bending and tempering a thin glass sheet comprising:
  heating the thin glass sheet to a heat-softened condition in a furnace,
  conveying the sheet out of the furnace and into a press bending station equipped with moulds having opposed complementary shaping surfaces, at least one of the surfaces being heated, shaping the sheet by pressing it between said opposed shaping surfaces while it is substantially horizontal, transferring the bent glass sheet out of the press bending station and into a quench station, tempering said sheet by quenching the surfaces of the sheet, removing the bent and tempered glass sheet from the quench station, characterised by maintaining the heated shaping surface at a temperature in the range from 200° C. to 350° C.

The heated shaping surface may be maintained at a temperature within the desired range by external heating, (i.e. by supply of heat directly to the shaping surface from a direction external to the mould), e.g. burners, or jets of hot air or gas. Such external heating means preferably operate intermittently so as to re-heat the shaping surface between the pressing of one glass sheet and the next.

Preferably, the heated shaping surface is maintained at the desired temperature by releasing heat within the mould on which the surface is provided. Such heat release may be the result of passing electric current through electric heating elements extending through the mould.

Alternatively, or additionally, heat release within the mould may be achieved by passing a hot fluid through conduits extending through the mould.

Preferably the shaping surface is maintained at a predetermined temperature in the range from 220° C. to 300° C., more preferably at a temperature around 250° C.

Preferably the time taken to transfer the bent glass sheet from the furnace to the quench station is 5-8 seconds.

While any glass up to 4.2 mm thick is considered to be thin glass, the present method is especially suitable for glass between 2.8 mm and 3.7 mm thick.

After pressing, the bent sheet may advantageously be retained in contact with the heating shaping surface by means of a difference in air pressure between the two faces of the sheet.

The present invention also provides an apparatus for bending and tempering a thin glass sheet comprising:

a furnace for heating the sheet to a heat-softened condition, a press bending station equipped with moulds having opposed complementary shaping surfaces for shaping the sheet while it is substantially horizontal, at least one of the surfaces being heated, means of conveying the sheet out of the furnace and into the press bending station, a quench station for quenching the surfaces of the bent glass sheet, so as to temper it, means of transferring the bent glass sheet out of the press bending station and into the quench station, characterised in that a heating means is provided to maintain the heated shaping surface of the mould at a predetermined temperature in the range from 200° C. to 350° C.

The heating means may be wholly exterior to the mould having the heated shaping surface, so as to supply heat directly to the shaping surface from a direction external to the mould. Examples of such external heating means are burners, radiant heaters, or jets of hot air or gas. A hot glass sheet is not considered to be an external heating means, even though the sheet may impart heat to the mould.

Alternatively or additionally, the mould may be provided with internal heating means, i.e. means to release heat within the mould so that heat is supplied to the shaping surface from a direction within the mould. The original energy source may nevertheless be outside the mould; by internal heating, the skilled person understands that energy (whether in the form of heat or not) is supplied into the mould, and released as heat within the mould.

There are several different means of internal heating; one such means comprises electrical heating elements situated in the mould, such as resistance elements located in spaced bores within part or all of the mould, and controlled by suitable temperature control circuits. Another internal heating means comprises providing conduits extending through the mould, through which a hot fluid is passed for heat exchange. The conduits are connected to an external source of heated fluid, e.g. to a circuit including a means of heating fluid, and the fluid may be liquid, e.g. an oil, or gaseous, e.g. air. Temperature control may be by control of fluid temperature or of mass flow of the fluid.

A fluid-heated mould may heat up more quickly from cold, and generally be more responsive to any alteration of the temperature which it is desired to achieve at the shaping surface. The fluid need only be around 50° C. to 100° C. hotter than this desired shaping surface temperature, whereas electric heating elements would normally be at a temperature nearer 200° C. hotter than the desired shaping surface temperature. This reduced differential aids control and allows more uniform temperatures to be achieved over the shaping surface. These advantages are enhanced when the mould is made from a material of high thermal conductivity, such as the aluminium alloys disclosed hereinafter.

Where there is a possibility that the shaping surface temperature may reach the maximum surface temperature of the material used to construct the mould, e.g. when there is a very high throughput of hot glass, fluid-heating possesses the further advantage that the fluid may also be used to cool the mould, if a means of fluid-cooling is included in the circuit round which the fluid flows.

Preferably the heated shaping surface is a full face shaping surface, i.e. one that extends over an entire face of the glass sheet. A mould having such a full face shaping surface is accordingly known as a full face mould. Full face moulds enable accurate shaping of the entire sheet, not just its periphery. Because such moulds have a higher heat capacity than, say, an outline or ring mould, they take longer to heat tip if not internally heated.

The shaping surfaces are preferably provided on a pair of moulds comprising an upper mould and a lower mould. Preferably the heated shaping surface is on the upper mould of the pair. Still more preferably, this surface is on a male, i.e. convex, mould. The lower mould is preferably an outline or ring mould having a shaping surface comprising a peripheral shaping rim which contacts the periphery of a lower face of the sheet, and the lower mould may itself be internally heated.

Glass bending moulds are made from a variety of metallic and non-metallic materials; preferred materials for the mould of the present invention are high temperature aluminium alloys or ceramics, including machinable ceramics. These materials may be cast, facilitating the inclusion of internal heating means.

Preferably the heated shaping surface is provided with an insulating cover. This has been found advantageous in maintaining the temperature of the glass sheet, especially when operating with a shaping surface temperature towards the lower end of the claimed range.

Preferably the upper mould is a vacuum mould, that is, one wherein the air pressure may be reduced at the shaping surface, so that the glass sheet is sucked onto the shaping surface of the mould as a result of a difference in air pressure between the two faces of the sheet. This may assist the shaping of the glass sheet, especially when the shape desired in the bent glass sheet includes an area of reverse curvature, i.e. a concave area in a generally convex sheet. It is also useful to be able to suspend the bent glass sheet from the upper mould by means of the vacuum when transferring it, e.g. onto a shuttle carrier ring for onward conveyance.

While such a mould is termed a vacuum mould, it is usual for pressures above, as well as below, atmospheric pressure to be applied at the shaping surface, for example to ensure a positive separation of the glass sheet from the upper mould when the sheet is released.

The invention also includes a glass sheet bent and tempered by a method or on an apparatus in accordance with the invention herein described.

BRIEF DESCRIPTION OF THE DRAWINGS

Preferred embodiments of the invention will now be described by way of non-limiting examples with reference to the accompanying drawings in which.

DETAILED DESCRIPTION OF THE PREFERRED EMBODIMENTS

Figure 1:
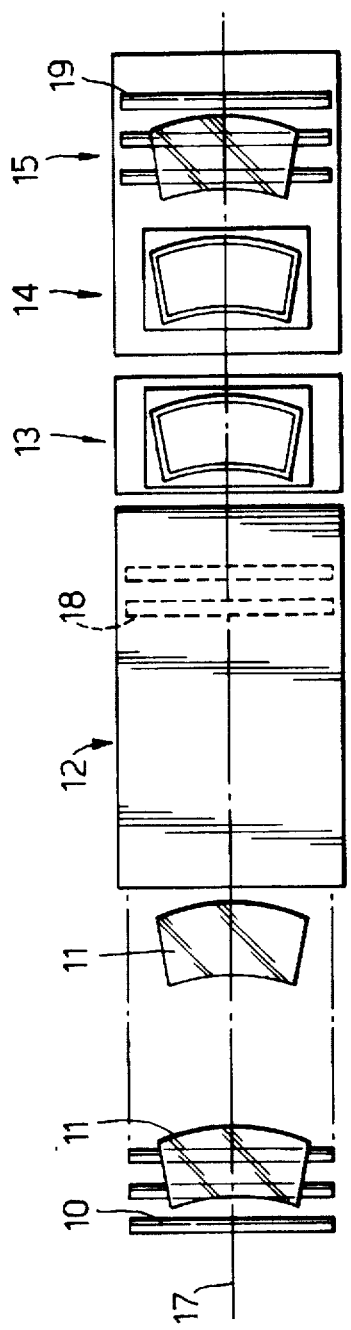
FIG. 1 is a highly schematic overall plan view of a press bending and tempering apparatus.

Referring to FIG. 1, the drawings show a press bending and tempering apparatus comprising a first or supply conveyor 10 which delivers glass sheets 11 to the entrance of a furnace 12. The furnace 12 includes a second conveyor 18 which transports the sheets 11 through the furnace 12 and delivers them to a press bending station 13 where the heat-softened lass sheets are pressed between complementary opposed shaping surfaces provided on press members in the form of moulds. The press bending station 13 is equipped with a third conveyor (not shown). The bent sheets are then transported through a quench station 14 where they are tempered, and into an unloading station 15, where the bent and tempered sheets are transferred onto a fourth conveyor 19 all in conventional fashion. Transport between the press bending station 13 and the unloading station 15 is preferably by means of a shuttle carrier ring, a technique known to those skilled in the art, or on rollers. The apparatus has a centre line 17.

Figure 2:
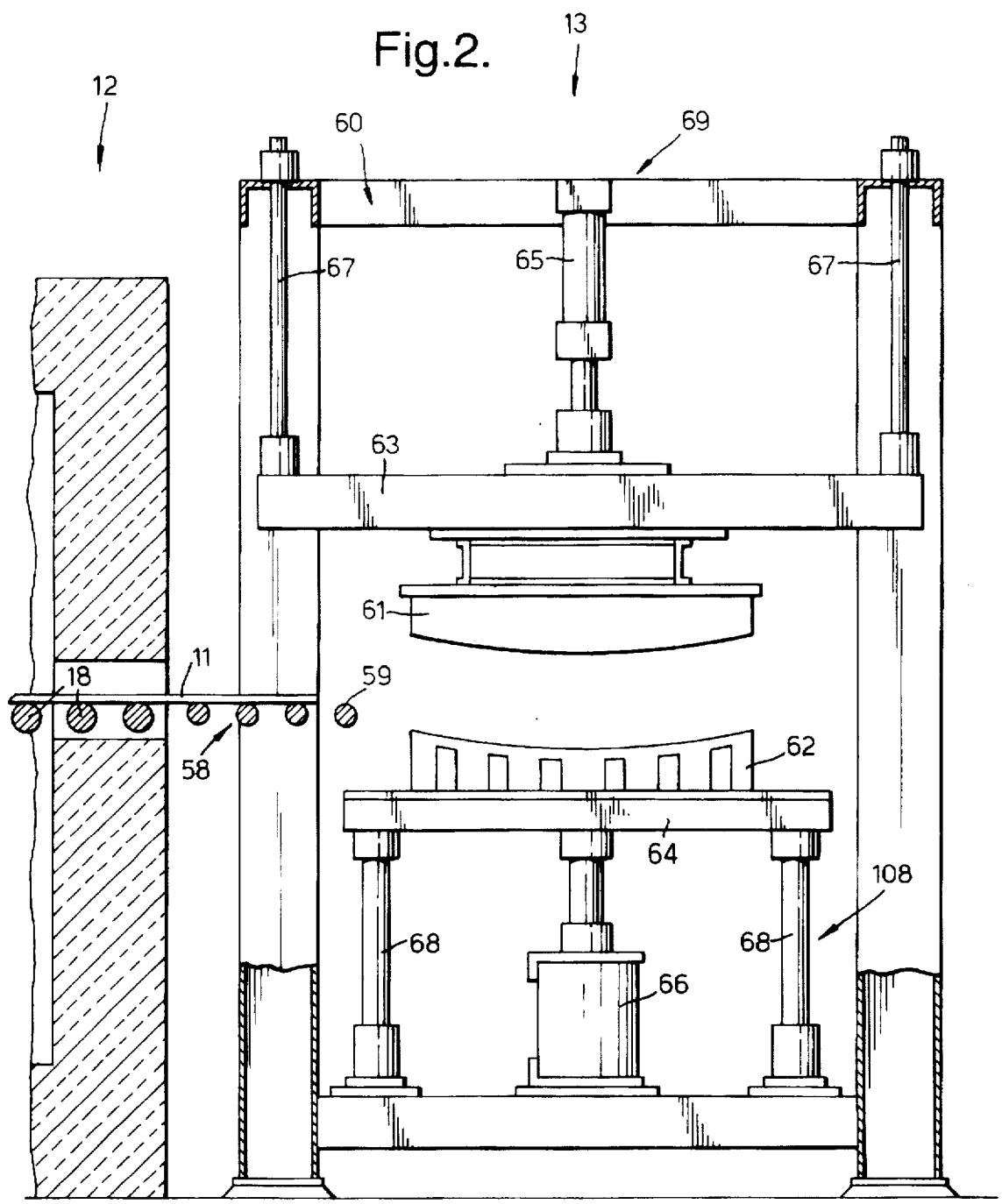
FIG. 2 is a side view, partly in section, of part of the press bending apparatus of FIG. 1.

FIG. 2 shows the latter part of furnace 12 and the press bending station 13, comprising a press 69 having opposed press members in the form of moulds as described above. The press is known in general terms from a variety of documents including WO 93/14038 which corresponds to U.S. Pat. No. 5,279,635, the disclosure of which is hereby incorporated herein by reference. It comprises a frame 60 with upper mould 61 and lower mould 62 mounted for opposed reciprocating movement within the frame. Moulds 61,62 are each mounted on a platen 63,64 respectively, which reciprocate vertically, guided by guiding, members 67,68. Elevator means 108 for the lower mould 62 is provided in the form of actuating cylinder 66; similarly, an actuating cylinder 65 is provided for upper mould 61. The press 69 is provided with third conveyor means 58 in the form of rollers 59 to convey the glass sheet 11 onto lower mould 62, but the majority of rollers 59 have been omitted from the press station 13 for clarity. The glass sheet 11 is preferably pressed by lower mould 62 rising up to upper mould 61 so that the sheet is in contact with both moulds simultaneously and is pressed into shape between them. Alternatively, pressing may be achieved as a result of the upper mould 61 descending towards the lower mould 62.

Figure 3:
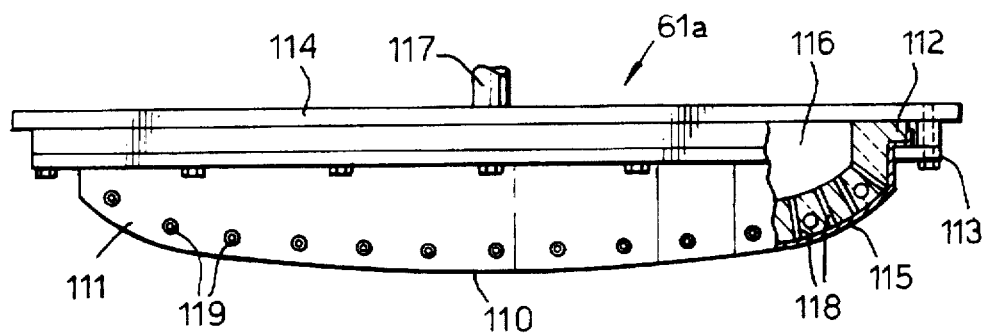
FIG. 3 is a side view, partially in section, of an upper mould which may be used in the press bending apparatuses herein described.
Figure 4:
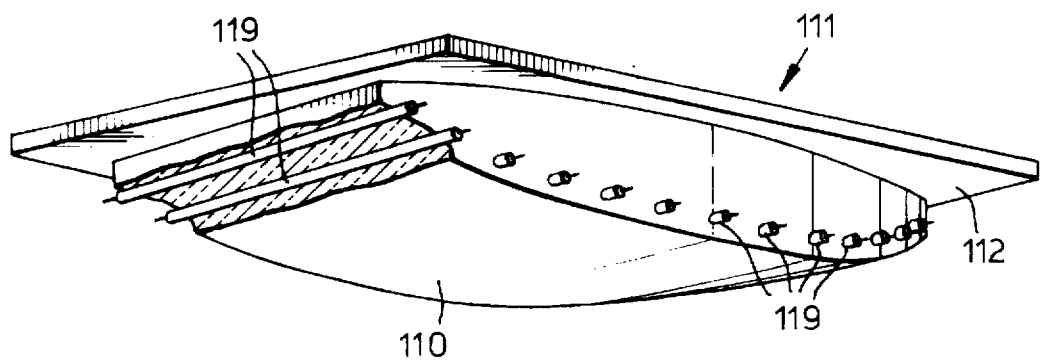
FIG. 4 is a perspective view, partially in section, of part of the upper mould of FIG. 3.

In the preferred embodiments herein described, the heated shaping surface is heated by internal heating means. Upper mould 61 is therefore internally heated, and is preferably a vacuum mould. FIGS. 3 and 4 show one possible design of vacuum upper mould 61a which is heated by means of electrical resistance heating elements and is known from WO 93/14038 which corresponds to U.S. Pat. No. 5,279,635. The mould 61a is of the solid and continuous type, having a continuous (and full face) shaping, surface 110 which is complementary to that of the lower mould. Surface 110 is provided on a mould body 111 which is formed of any suitable material capable of withstanding the elevated temperatures to which it is subjected and may, for example, advantageously be a refractory material such as a ceramic material. An outwardly extending flange 112 integrally formed along, preferably, the entire perimeter of the mould body 111, cooperates with a plurality of L-shape brackets 113 for mounting the mould body to a support plate 114 suitably attached to the upper platen 63. To provide a resilient non-abrasive surface for contact with the heat softened glass sheet and to provide insulation, the shaping surface 110 is covered with one or two sheets 115 of durable heat-resistant cloth, such as woven or knit fibreglass or the like. Each cloth sheet 115 is stretched tautly over the shaping surface 110 and held in place by suitable means.

A chamber 116 may be formed in the mould body 111, to serve as a manifold for a positive or negative air pressure to assist in the shaping and handling of the glass sheets. To that end, the shaping surface 110 is provided with a plurality of air passages 118 in communication with the chamber 116, and the mould body 111 is provided with a conduit 117 also in communication with the chamber 116 and a vacuum pump or a source of air under pressure. The air passages 118 may be in the form of bores which may be drilled, or a porous or less dense refractory material, i.e. one containing small passages, can be chosen for the mould body that would permit a flow of air through the shaping surface into, or out of, the chamber without the need for the drilled passages. The bores or passages terminate at apertures in the shaping surface, which is perforated thereby, notwithstanding that it is a full face shaping surface. A negative air pressure, or vacuum, thus can be provided at the shaping surface of the upper mould 61 to assist in retaining the sheet thereon, or conforming the sheet thereto. The vacuum can then be utilized to support the sheet as the lower mould 62 is lowered and a carrier ring of a shuttle means is moved into position to transport the sheet out of the press station.

Figure 5:
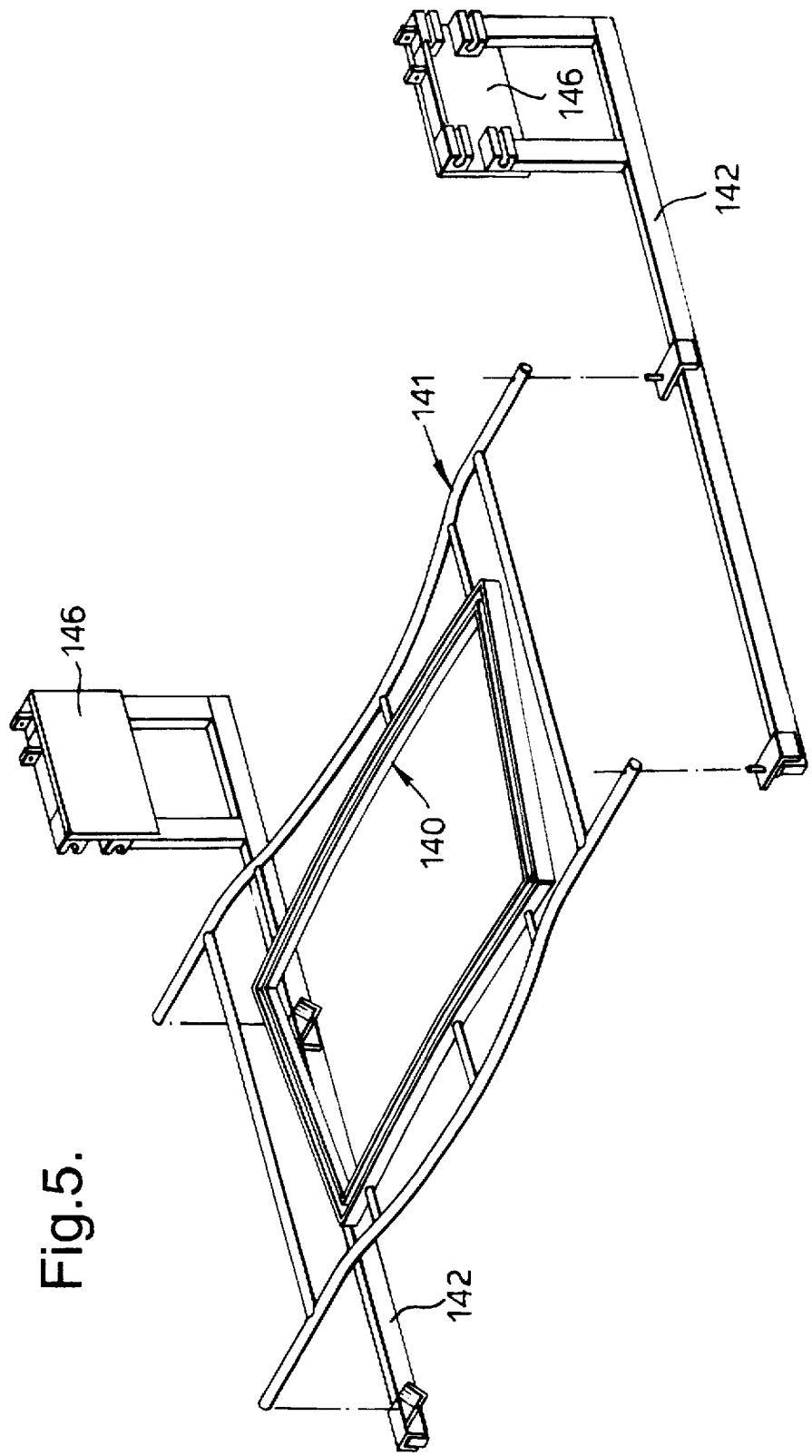
FIG. 5 is a perspective view of part of a shuttle means which may be included in the apparatus of FIG. 1.

FIG. 5 shows part of the shuttle means. It comprises a carrier ring 140 confirming in outline and elevation to the periphery of the bent glass sheet. Ring 140 is mounted within a frame 141 which is supported on arms 142. The shuttle arms 142 are slidably mounted on glide rails (not shown) by means of glide plates 146, and propelled along the rails by drive means (not shown). This arrangement permits the shuttle carrier ring 140 to reciprocate between the press station 13 and the quench station 14. When the carrier ring 140 is in position under the upper mould 61, the latter descends to a position slightly above the ring. The air pressure at the apertures is suddenly increased to a level above atmospheric pressure, so that the bent sheet is positively released from the upper mould 61 without any tendency to tilt, and is placed accurately upon the carrier ring. This technique avoids the risk of marking the sheet as a result of it falling a significant distance, and alleviates problems of alteration of shape through inaccurate placement on the carrier ring. The carrier ring then transfers the bent sheet into the quench station.

Returning to FIGS. 3 and 4 the upper mould 61 is provided with a plurality of heating elements 119, which are of an electrical resistance type suitable to be employed in the refractory mould body 111. The elements themselves are capable of reaching temperatures of the order of 600° C., producing temperatures up to 400° C. at the shaping surface. Surprisingly, however, it has been found that good optical quality and adequate tempering can be achieved with shaping surface temperatures as low as 200° C. The normal range of operating temperatures used at the shaping surface is 200°–350° C., and temperatures of 220° C. to 300° C., especially around 250° C., are preferred.

Elements 119 may be embedded in the mould body 111 by casting it with the elements in place, or bores may be provided (e.g. by drilling) into which the elements are inserted. The elements 119 are connected manner to a suitable control unit (not shown) for regulating the power. The elements may be connected for individual control, or grouped in zones which are separately controlled. Thermocouples (not shown) may also be provided within the mould body 111 near the shaping surface 110 to provide temperature readings at appropriate points to enable the temperatures across the shaping surface to be controlled. A further method of internally heating a vacuum mould is to pass hot ail or gas through the vacuum system (i.e. conduit 117, chamber 116, and passages 118), so that the hot or gas exits the apertures in the shaping surface, thereby heating it.

Figure 6:
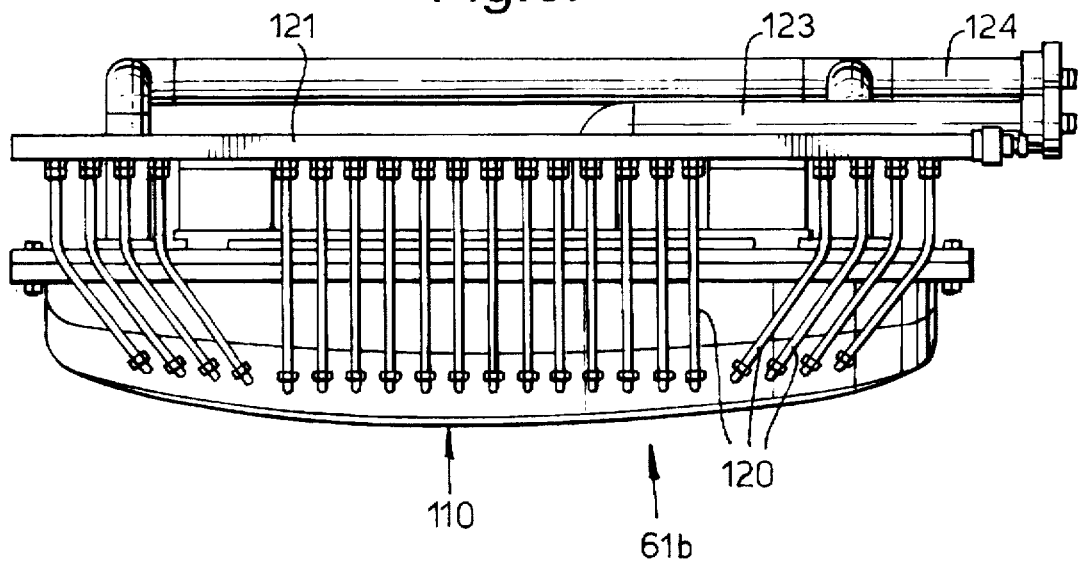
FIG. 6 is a side view of an alternative upper mould to that of FIGS. 3 and 4.
Figure 7:
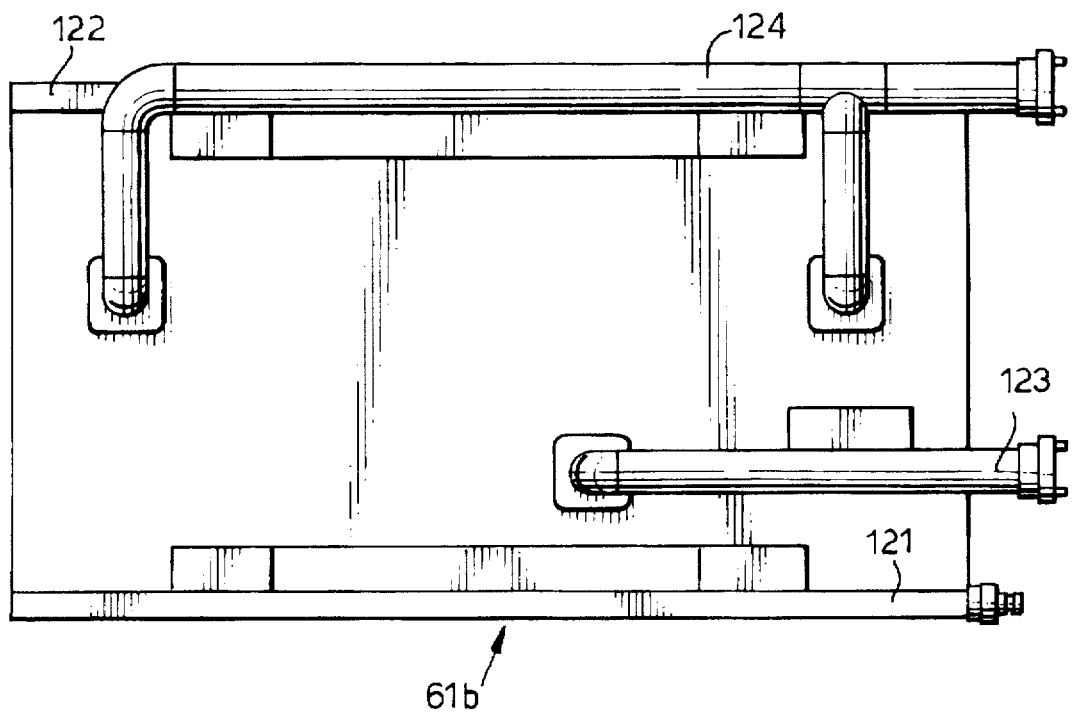
FIG. 7 is a plan view of the mould of FIG. 6.
Figure 8:
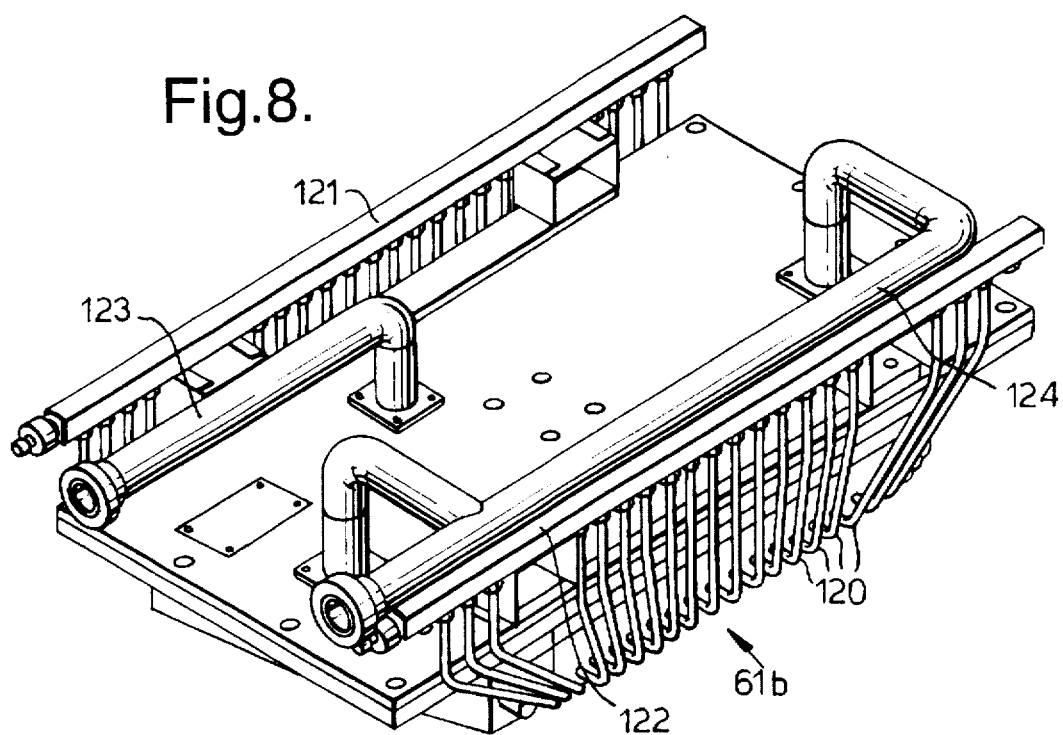
FIG. 8 is a perspective view of the mould of FIGS. 6 and 7.

FIGS. 6 to 8 show all alternative upper mould 61b. Like upper mould 61a, this is also an internally heated vacuum mould, but the heating is achieved in a novel fashion, by passage of a hot fluid through conduits in the mould, e.g. in the form of bores. The mould is cast from an aluminium alloy durable to high temperatures and includes bores which traverse the shorter dimension of the mould when seen in plan. The bores are connected to tubes 120, which may be of steel, or alternatively the tubes 120 may pass right through the mould, being cast into the mould. On one side of the mould the tubes 120 are connected to an inlet manifold 121, and on the other side they are connected to an outlet manifold 122, and a hot fluid is circulated through the conduits in the mould via the manifolds and tubes. Suitable fluids include mineral oils or synthetic oils which are of low volatility at 300° C. and have a specific heat capacity of 1.5 to 2.5 KJ/kg. Using such oils at 300° C., temperatures of 200° C. to 250° C. can be achieved at the shaping surface 110 with tubes 120 between 8 and 10 mm in internal diameter and a fluid velocity of about 1 dm³/second. Alternatively, hot air or gas may be passed through the conduits. The shaping surface temperature may be controlled by controlling either the temperature or mass flow of the fluid.

As with upper mould 61a, mould 61b may be provided with an internal chamber connected to a source of negative or positive pressure, and in communication with apertures in the shaping surface. In fact the particular mould shown in FIGS. 6–8 is provided with three chambers comprising a central chamber and two end chambers arranged along the length of the mould. The central chamber is connected to vacuum/air conduit 123, and likewise the end chambers are connected to vacuum/air conduit 124. This multiple chamber arrangement makes it possible for example to provide differing degrees of suction in the end regions of the shaping surface compared with in the middle, which is advantageous for certain shapes. The arrangement is not limited to mould type 61b, but may also be provided in type 61a.

The important differences between the two types of upper mould are the means of heating and the materials used. Each type of material has advantages for different situations. Refractory mould 61a is more durable and the mould material does not in practice pose any constraints on operating temperature. However, the aluminium alloy of mould 61b has a thermal expansion such that it expands about the same amount, when heated from ambient to its working temperature of 200° C.–250° C., as a glass sheet expands when heated from ambient to its bending temperature of around 600° C. This means that the mould can be machined according to the shape of the bent sheet required at ambient temperature, without any compensation for thermal expansion. Because the material is machinable, changes to the mould may be made which call for removal of material, whereas a new refractory mould would normally have to be cast, unless a modern machinable ceramic had been used. The maximum temperature at which mould 61b may be operated depends on the particular alloy used. High temperature alloys are being developed which may allow operation at temperatures approaching 300° C. While it is preferred that the fluid-heated mould is made from aluminium alloy, and the electrically heated mould is ceramic, it is of course possible to engineer different combinations of mould materials and heating techniques.

Figure 9:
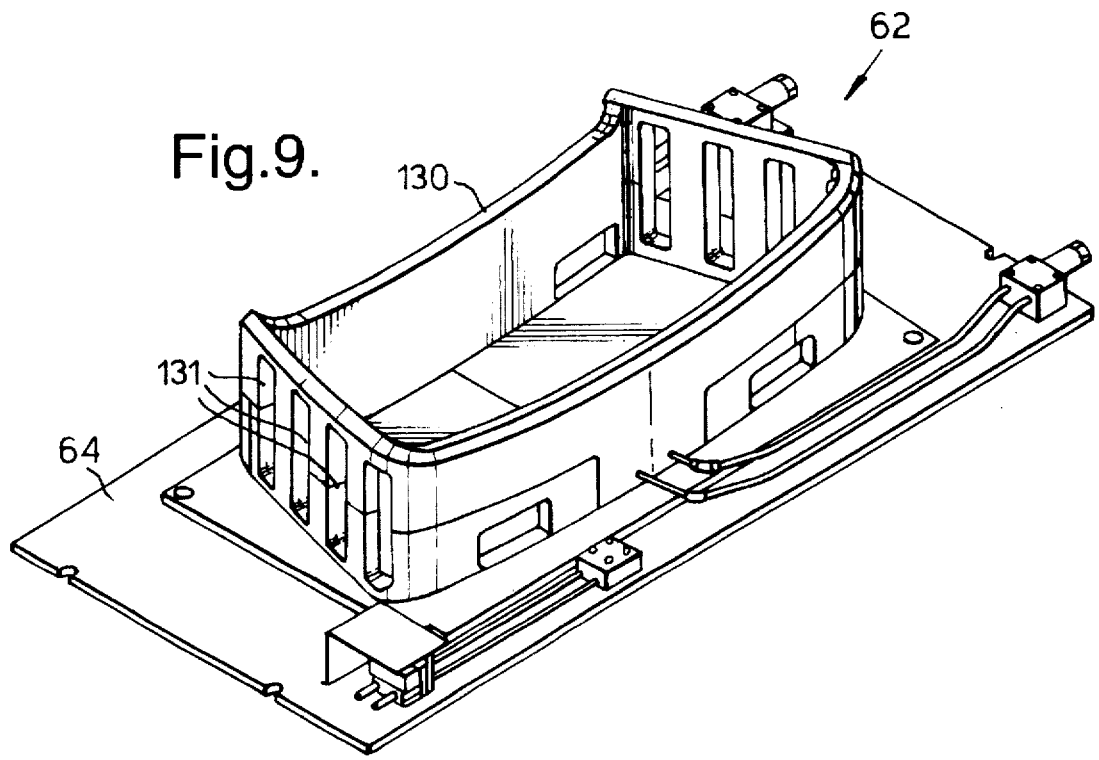
FIG. 9 is a perspective view of a lower mould which may be used in the press bending apparatuses herein described.

FIG. 9 shows the lower mould 62 which is of female or concave form, and comprises a shaping surface in the form of a continuous shaping rim 130 complementary to the periphery of the full face shaping surface 110 of the upper mould 61. The end walls of the mould are provided with vertically extending slots 131 to accommodate the supports and driveshafts for the rollers 59 (not shown on FIG. 9) if the lower mould 62 is to be raised relative to the rollers. Alternatively, lower mould 62 can take the form of a shaping rail supported on upright rods, between which the roller supports and drives can be accommodate.

The mould of FIG. 9 is not internally heated, but could be so heated by, for example, either the electrical heating or the oil heating techniques described in conjunction with FIGS. 3, 4, 6 and 7. The lower mould would, for example, preferably be heated in an arrangement where it is a full face lower mould, used possibly with all upper mould of outline or ring form.

After bending, the sheet is transferred to the quench station, where it can be adequately tempered by conventional means, e.g. air jets, despite having been bent at a surprisingly low temperature. The bent and tempered sheet is then removed from the quench station and unloaded by conventional means.

What is claimed is:

1. A method of bending and tempering a substantially horizontally oriented thin glass sheet in a bending apparatus, the bending apparatus including a furnace for heating the sheet, a press bending station equipped with moulds having opposed complementary shaping surfaces, at least one of the surfaces being heated, a shuttle means including a carrier ring and a quench station, wherein the method comprises the steps of:

heating a thin glass sheet to a heat-softened condition in said furnace, conveying the glass sheet out of the furnace and into said press bending station, shaping the glass sheet by pressing it between said opposed shaping surfaces to provide a bent glass sheet having two major surfaces and a periphery, maintaining the at least one heated shaping surface at a temperature in the range from 200° C. to 350° C. during shaping of the glass sheet, maintaining the glass sheet in a substantially horizontal orientation during the heating, conveying and shaping steps, placing the bent glass sheet upon the carrier ring, the carrier ring conforming in outline and elevation to the periphery of the bent glass sheet;

transferring the bent glass sheet out of the press bending station on the carrier ring of the shuttle means and into said quench station, tempering said bent glass sheet on said carrier ring by quenching the major surfaces of the bent glass sheet to provide a bent and tempered glass sheet, removing the bent and tempered glass sheet from the quench station.

2. A method as claimed in claim 1, wherein said step of maintaining the temperature of the at least one heated shaping surface includes releasing heat within the mould having the at least one heated surface.

3. A method as claimed in claim 2, wherein said step of releasing heat within the mould includes passing electric current through electric heating elements extending through the mould.

4. A method as claimed in claim 2, wherein said step of releasing heat within the mould includes passing a hot fluid through conduits extending through the mould.

5. A method as claimed in claim 1, wherein said at least one heated shaping surface is maintained at a temperature in the range from 220° C. to 300° C.

6. A method as claimed in claim 5, wherein said temperature is around 250° C.

7. A method as claimed in claim 1, wherein the thin glass sheet is up to 4.2 mm thick.

8. A method as claimed in claim 7, wherein the thin glass sheet is between 2.8 and 3.7 mm thick.

9. A method as claimed in claim 1, wherein the time taken to transfer the glass sheet from the furnace to the quench station is between 5 and 8 seconds.

10. A method as claimed in claim 1, including retaining the bent glass sheet in contact with the at least one heated shaping surface by way of a difference in air pressure between the two major surfaces of the bent glass sheet.

11. A method of bending and tempering a thin glass sheet in a bending apparatus, the sheet having two major surfaces, and the bending apparatus including a furnace for heating the sheet, a press bending station equipped with moulds having opposed complementary shaping surfaces, at least one of the surfaces being heated, and a quench station, wherein the method comprises the steps of:

heating a thin glass sheet to a heat-softened condition in said furnace, conveying the glass sheet out of the furnace and into said press bending station, shaping the glass sheet by pressing it between said opposed shaping surfaces while it is substantially horizontal to provide a bent glass sheet having two major surfaces, maintaining the at least one heated shaping surface at a temperature in the range from 200° C. to 350° C. during of the glass sheet, transferring the bent glass sheet out of the press bending station and into said quench station, tempering said bent glass sheet by quenching the major surfaces of the bent glass sheet to provide a bent and tempered glass sheet, and removing the bent and tempered glass sheet from the quench station.

12. A method as claimed in claim 11, wherein said step of maintaining the temperature of the at least one heated shaping surface includes releasing heat within the mould having the at least one heated surface.

13. A method as claimed in claim 12, wherein said step of releasing heat within the mould includes passing electric current through electric heating elements extending through the mould.

14. A method as claimed in claim 12, wherein said step of releasing heat within the mould includes passing a hot fluid through conduits extending through the mould.

15. A method as claimed in claim 11, wherein said at least one heated shaping surface is maintained at a temperature in the range from 220° C. to 300° C.

16. A method as claimed in claim 15, wherein said temperature is around 250° C.

17. A method as claimed in claim 11, wherein the thin glass sheet is up to 4.2 mm thick.

18. A method as claimed in claim 17, wherein the thin glass sheet is between 2.8 and 3.7 mm thick.

19. A method as claimed in claim 11, wherein the time taken to transfer the glass sheet from the furnace to the quench station is between 5 and 8 seconds.

20. A method as claimed in claim 11, including retaining the bent glass sheet in contact with the at least one heated shaping surface by way of a difference in air pressure between the two major surfaces of the bent glass sheet.

* * * * *